July 31, 1945.  A. R. ADAMS  2,380,568
FASTENER
Filed Jan. 21, 1944
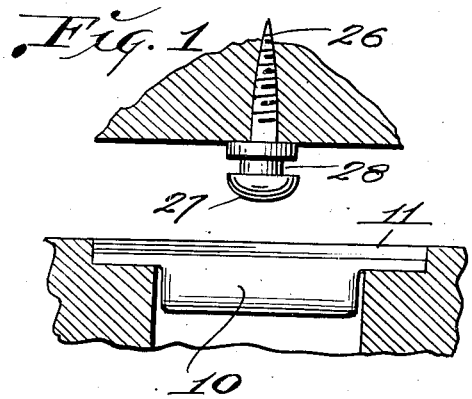
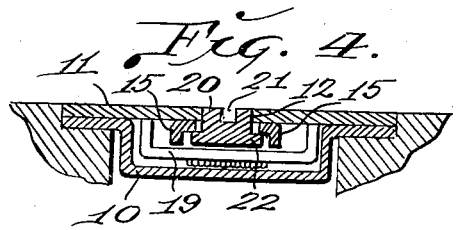
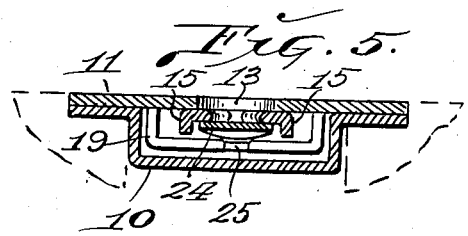
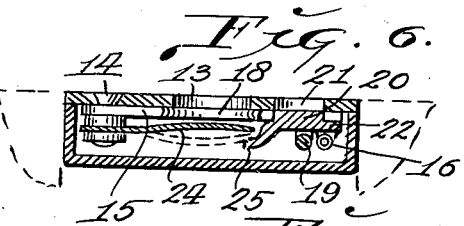
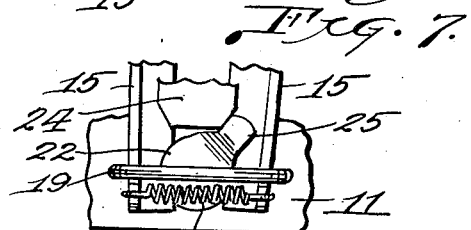
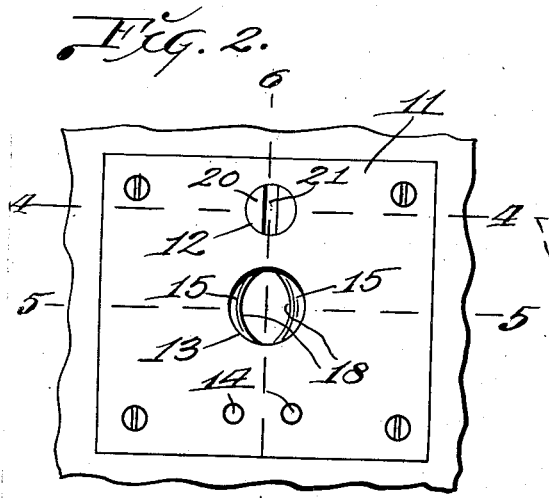
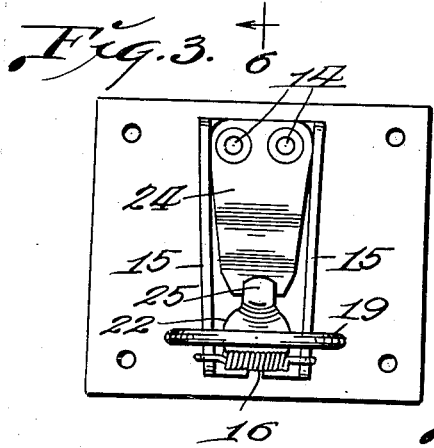
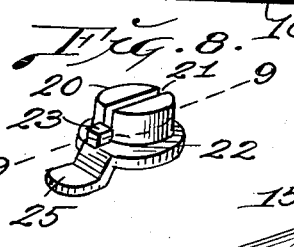
INVENTOR.
ARTHUR R. ADAMS
BY Martin P. Smith
ATTY.

Patented July 31, 1945

2,380,568

UNITED STATES PATENT OFFICE 2,380,568

FASTENER

Arthur R. Adams, Glendale, Calif.

Application January 21, 1944, Serial No. 519,118

6 Claims. (Cl. 85—5)

My invention relates generally to connecting and fastening means and more particularly, though not exclusively, to a quick acting, readily releasable fastener which may be advantageously employed for detachably securing chairs, tables and other pieces of furniture to the floor, also for detachably connecting parts of buildings, such as walls, floors, partitions panels, sliding doors and the like, also knock down structures such as boxes, cabinets and shelving, for cargo tie-downs and for the suspension of heavy pictures, hanging bric-a-brac and the like.

The principal objects of my invention are, to generally improve upon and simplify the existing forms of quick acting readily releasable connecting and fastening devices and to provide a fastener of simple, compact, durable structure, wherein one member includes a pair of spring held jaws, adapted to receive and securely hold an inserted stud or headed member and which two members are carried respectively by the structural parts or elements which are to be detachably connected.

Further objects of my invention are, to provide simple and easily operated means for releasing the parts of the fastener and to provide means for expelling or "kicking" the engaged head or stud from the gripping means when the latter is released and to provide simple and efficient means whereby the jaws and the expelling or "kick out" spring may be maintained in inoperative positions until the engaged stud is withdrawn from the position between the jaws, and which provision is particularly desirable when an object or member such as a heavy piece of furniture is detachably connected to the floor by two or more fastening devices.

With the foregoing and other objects in view, my invention consists in certain novel features of construction and arrangement of parts which will be hereinafter more fully described and claimed and illustrated in the accompaning drawing in which:

Fig. 1 is an elevational view of the two parts of the fastener mounted in structural parts or elements which are to be connected and fastened.

Fig. 2 is a plan view of the housing member of the fastener.

Fig. 3 is a view looking against the underface of the cover plate of the housing.

Fig. 4 is a section taken on the line 4—4 of Fig. 2.

Fig. 5 is a cross section taken on the line 5—5 of Fig. 2.

Fig. 6 is a cross section taken on the line 6—6 of Fig. 2.

Fig. 7 is an enlarged fragmentary view looking against the underfaces of the free end portions of the jaws and showing same maintained in spread apart position.

Fig. 8 is a perspective view of the rotary jaw releasing member.

Fig. 9 is a horizontal section taken on the line 9—9 of Fig. 8.

Fig. 10 is a perspective view of one of the stud engaging jaws.

Referring by numerals to the accompanying drawing which illustrates a preferred embodiment of my invention, 10 designates a shallow box-like housing, the top of which is closed by a readily removable cover plate 11 and formed in the central portion of the latter, are apertures 12 and 13.

Pivoted on studs or rivets 14 seated in cover plate 11 and disposed on the underside of the latter are jaws 15 which extend across the apertures 12 and 13 and connecting the free ends of these jaws is a small retractile spring 16.

The inner edges of the jaws 15 below apertures 12 are provided with notches 17 and below aperture 13 said inner edges are notched as designated by 18.

Underlying the free ends of jaws 15 inwardly from spring 16 is a transversely disposed keeper 19, the ends of which are fixed to cover plate 11. The central portion of this keeper lies beneath the notches 17 and aperture 12.

Arranged for rotation in aperture 12 is the upper portion of a stud 20, in the lower end of which is formed a slot 21 adapted to receive the point of a screwdriver or like tool and formed on the lower end of said stud is an annular flange 22.

Obviously a short crank handle, a cylinder lock or other conventional means may be applied to or associated with stud 20 for the purpose of rotating same.

Formed integral with the upper face of flange 22, and with stud 20 below the ends of slot 21, are lugs 23 which normally occupy positions between the inner edges of the jaws 15 just beyond the ends of notches 17.

Secured to the lower ends of studs 14 below the ends of jaws 15 is one end of a flat spring 24, the central portion of which is bowed upwardly toward the notches 18 in jaws 15 and the free end of this spring terminates adjacent the edge of flange 22 on stud 20.

Projecting from flange 22 and extending downwardly therefrom is a lip or short finger 25 which underlies the free end of spring 24 (see Fig. 6).

As seen in Fig. 1 the member which is engaged by the jaws 15, may be a threaded shank such as 26, seated in one of the structural parts to be connected and said shank having an integral head or stud 27, the outer ends of which is rounded, and formed in said head is an annular groove 28 for the reception of the jaws 15 when the parts of the fastener are connected.

To connect the parts carrying the housing and stud, the latter is passed through aperture 13, between the notches 18 in the jaws, thereby swinging same apart a sufficient distance to permit the lower portion of the stud to pass below the jaws, whereupon spring 16 will act to draw the jaws toward each other with the edges of the notches 18 engaged in groove 28, thus securely connecting the assembled parts.

When stud 27 is inserted as just described, spring 24 is engaged and flexed downwardly so that its free end bears with pressure against lip 25. (See dotted lines Fig. 6.)

To disconnect the parts, the point of a screwdriver or like tool is engaged in slot 21 and stud 20 is partially rotated in either direction and lugs 23 will engage the jaws to swing same apart and the pressure of spring 24 against stud 27 will "kick" same from between the jaws and out through aperture 13 depending upon the weight of the article or member which carries the stud.

In the event that two or more of the fasteners are used for connecting parts, for instance, articles of furniture, such as chairs to a floor, it is desirable to open the jaws in sequence and to maintain same in open position until the part carrying the several studs can be lifted so as simultaneously withdraw all studs from between the pairs of jaws.

To do this, each stud 20 is rotated in one direction or the other until lip 25 passes the end of spring 24 and thereupon said spring will flex downward into position where one of its edges will engage one of the side edges of said lip, thus preventing the stud from rotating back to normal position and consequently maintaining the jaws spread apart. (See Fig. 7.)

In order to facilitate this function the corners of spring 24 are cut off at angles to provide inclined edges 24a against which the edges of the lips 25 engage.

After all of the studs have been rotated to spread the jaws apart, the chair or other article is lifted from the floor and as springs 24 flex upwardly, following the upward movement of the studs, the lips 25 are freed, thus enabling the studs to return to their normal positions as a result of the engagement of the edges of notches 17 against lugs 23.

Thus, spring 24 in addition to "kicking" the stud out from between the jaws, acts under the weight of the part carrying the stud 27, to maintain the jaws in open position as a result of engagement of said spring with the edge of the lip 25 carried by rotating stud 20.

Thus it will be seen that I have provided a fastener of simple, compact structure, inexpensive of manufacture and very effective in performing the functions for which it is intended.

It will be understood that minor changes in the size, form and construction of the various parts of my improved fastener may be made and substituted for those herein shown and described, without departing from the spirit of the invention, the scope of which is set forth in the appended claims.

I claim as my invention:

1. In a fastener, a housing including a cover plate having an opening, a pair of jaws pivoted on the underside of said cover plate and extending across the opening therein, a spring secured at one end with its free end underlying said jaws, said opening and means mounted for rotation on said cover plate for spreading said jaws apart and a lip on said jaws spreading means, which lip extends beneath the free end of said spring.

2. A fastener as set forth in claim 1 including a keeper disposed beneath said jaw spreading means and the free ends of said jaws.

3. A fastener as set forth in claim 1 including a stud adapted to be inserted through the aperture in the cover plate and which stud is provided with a jaw receiving groove.

4. In a fastener, a housing including a cover plate having an opening, a pair of jaws pivoted to the underside of said cover plate and extending across said opening, means for yieldingly resisting spreading movement of said jaws, rotary means mounted for movement on said cover plate for spreading said jaws apart, a lip on said rotary means and a resilient member secured to the cover plate at one end with its free end underlying the opening in said cover plate and overlying said lip.

5. A fastener as set forth in claim 4 including a stud adapted to enter the opening in said cover plate and exert pressure on said resilient member, which stud is provided with a jaw receiving groove.

6. In a fastener, the combination with a plate having an aperture, of a pair of spring held jaws pivoted to the underside of said plate with their inner edges extending across the aperture in said plate, a member mounted for rotary movement on said plate between the free ends of said jaws, a resilient member secured at one end to the underside of said plate and extending beneath the aperture therein and a lip on said rotary member, which lip is normally positioned beneath the free end of said resilient member.

ARTHUR R. ADAMS.